United States Patent
Miyano et al.

(10) Patent No.: US 10,356,367 B2
(45) Date of Patent: Jul. 16, 2019

(54) BLIND SPOT COVERAGE DEVICE, CONTROL DEVICE, AND RECORDING MEDIUM STORING DISTRIBUTED CONTROL PROGRAM FOR MOVING BODY

(71) Applicant: KABUSHIKI KAISHA TOYOTA CHUO KENKYUSHO, Nagakute-shi, Aichi-ken (JP)

(72) Inventors: Tatsuya Miyano, Nagakute (JP); Kazuki Shibata, Nagakute (JP); Tomohiko Jimbo, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days.

(21) Appl. No.: 15/824,239

(22) Filed: Nov. 28, 2017

(65) Prior Publication Data

US 2018/0152671 A1    May 31, 2018

(30) Foreign Application Priority Data

Nov. 30, 2016   (JP) .................... 2016-233139

(51) Int. Cl.
*G08B 23/00*    (2006.01)
*H04N 7/18*    (2006.01)
(Continued)

(52) U.S. Cl.
CPC .............. *H04N 7/18* (2013.01); *G05B 19/02* (2013.01); *H04N 7/185* (2013.01); *G01S 19/01* (2013.01); *G06T 2207/30232* (2013.01)

(58) Field of Classification Search
CPC .......... H04N 7/18; H04N 7/185; G05B 19/02; G01S 19/01; G06T 2207/30232
See application file for complete search history.

(56) References Cited

U.S. PATENT DOCUMENTS 8,200,428 B2 *   6/2012   Anderson ............ G05D 1/0287
                                                             701/453
9,588,516 B1 *   3/2017   Gurel .................... G05D 1/0033
                         (Continued)

FOREIGN PATENT DOCUMENTS

JP          2011-048736 A      3/2011
JP          2011-086995 A      4/2011
                    (Continued)

OTHER PUBLICATIONS

Jorgé Cortes et al. "Coverage Control for Mobile Sending Networks". IEEE Transactions on Robotics and Automation, vol. 20, 2004, pp. 243-255.
(Continued)

*Primary Examiner* — Quang Pham
(74) *Attorney, Agent, or Firm* — Oliff PLC (57) ABSTRACT

A blind spot coverage device that includes: a sensor section that senses external environmental information; a definition section that defines an external environmental region, in which sensing information is unobtainable, as a blind spot region; a determination section that determines whether or not the blind spot region is to be covered; and an instructing section that, in a case in which the determination section determines that the blind spot region is to be covered, instructs an actuator to move such that the blind spot region is covered. The determination section determines that the blind spot region is to be covered in a case in which determination is made that the blind spot region lacks global coverage.

3 Claims, 10 Drawing Sheets

(51) Int. Cl.
*G05B 19/02* (2006.01)
*G01S 19/01* (2010.01)

(56) References Cited

U.S. PATENT DOCUMENTS

| | | | |
|---|---|---|---|
| 10,137,984 B1* | 11/2018 | Flick | G08G 5/045 |
| 2003/0191568 A1* | 10/2003 | Breed | B60W 40/06 |
| | | | 701/36 |
| 2008/0009970 A1* | 1/2008 | Bruemmer | G05D 1/0088 |
| | | | 700/245 |
| 2010/0127853 A1* | 5/2010 | Hanson | G01S 5/0289 |
| | | | 340/539.13 |
| 2011/0153117 A1* | 6/2011 | Koch | E02F 9/2054 |
| | | | 701/2 |
| 2012/0092208 A1* | 4/2012 | LeMire | G01S 13/87 |
| | | | 342/29 |
| 2013/0261949 A1* | 10/2013 | Eriksson | G05D 1/104 |
| | | | 701/300 |
| 2014/0035725 A1* | 2/2014 | Bruemmer | G06K 7/10306 |
| | | | 340/8.1 |
| 2014/0211002 A1* | 7/2014 | Lin | H04N 7/181 |
| | | | 348/143 |
| 2015/0042815 A1* | 2/2015 | Park | H04N 7/181 |
| | | | 348/159 |
| 2015/0289145 A1* | 10/2015 | Sun | H04W 24/04 |
| | | | 455/446 |
| 2016/0105649 A1* | 4/2016 | Pettegrew | G06T 7/80 |
| | | | 348/37 |
| 2016/0203723 A1* | 7/2016 | Kube | G08G 5/045 |
| | | | 701/3 |
| 2016/0328979 A1* | 11/2016 | Postrel | B64C 39/024 |
| 2016/0347462 A1* | 12/2016 | Clark | B64C 39/024 |
| 2017/0086428 A1* | 3/2017 | Horton | A01K 29/005 |
| 2017/0251181 A1* | 8/2017 | Smolyanskiy | G01C 21/3484 |
| 2017/0253330 A1* | 9/2017 | Saigh | B64C 39/024 |
| 2018/0101173 A1* | 4/2018 | Banerjee | G06T 7/70 |
| 2018/0152671 A1* | 5/2018 | Miyano | H04N 7/185 |

FOREIGN PATENT DOCUMENTS

| | | |
|---|---|---|
| JP | 2011-108084 A | 6/2011 |
| JP | 2014-150483 A | 8/2014 |
| JP | 2016-118996 A | 6/2016 |

OTHER PUBLICATIONS

Mar. 12, 2019 Office Action issued in Japanese Application No. 2016-233139.

* cited by examiner

NOTES:
AFTER MOVEMENT (CURRENT LOCATION) ⬭ BEFORE MOVEMENT
— — — VORONOI REGION BOUNDARY LINE

VORONOI REGION BOUNDARIES
IMMEDIATELY PRIOR TO MOVEMENT
CONTROL USING CONTROL RULE 2

NOTES:
(1) DETECT APPROACHING VEHICLE
(2) DESIGNATE POTENTIAL RISK
(3) MOVE MOVING BODY
    (CONTROL RULE 2)
(4) TRANSMIT IMAGING INFORMATION
    TO APPROACHING VEHICLE

BLIND SPOT COVERAGE DEVICE, CONTROL DEVICE, AND RECORDING MEDIUM STORING DISTRIBUTED CONTROL PROGRAM FOR MOVING BODY

CROSS-REFERENCE TO RELATED APPLICATION

This application is based on and claims priority under 35 USC 119 from Japanese Patent Application No. 2016-233139 filed on Nov. 30, 2016, which is incorporated by reference herein.

BACKGROUND

Technical Field

The present disclosure relates to a blind spot coverage device that covers a blind spot region with a sensor section, a control device that causes movement such that a designated monitoring target region comes into a monitoring range, and a recording medium storing a moving body distributed control program.

Related Art

Japanese Patent Application Laid-Open (JP-A) No. 2016-118996 describes a monitoring system that controls movement of a flying device to an appropriate position to address a monitoring target.

To explain in more detail, the monitoring system includes at least a flying device that monitors the ground from the air and a center device. The center device includes a storage section that stores an elevation angle with respect to the monitoring target for each type of control, a target computation section that, when input with a control signal including a control type, references the storage section and computes a target position to match the elevation angle corresponding to the control type, and a flying device controller that moves the flying device to the target position.

However, JP-A No. 2016-118996 does not apply logic that envisages the presence of plural moving bodies. Moreover, a detailed action plan needs to be implemented for the moving body, Moreover, in JP-A No. 2016-118996, centralized processing is performed by the center device, resulting in a large calculation load, such that, were the scale to be increased, it would not be possible to obtain solutions within a realistic time frame.

Distributed control technology that defines Voronoi regions exists as technology for controlling plural moving body without resorting to centralized control.

For example, in cases in which plural moving bodies equipped with cameras are moved to potential risks (monitoring target regions) set within a predetermined region so as to monitor the potential risks, partitioning the predetermined region into Voronoi regions and setting each partitioned region as a region of responsibility for respective moving bodies enables collisions between the moving bodies to be avoided.

Technology to define Voronoi regions is capable of providing logic most-suited when plural moving bodies are envisaged. Moreover, there is no need to implement a detailed action plan for each of the moving bodies, and the respective moving bodies are capable of autonomous, distributed decision making while communicating with their surroundings.

Moreover, since processing is distributed rather than centralized, the calculation load is small, enabling solutions to be obtained in a realistic timeframe that is not dependent on the scale.

Note that the moving bodies repeatedly move within Voronoi regions enclosed by perpendicular bisectors between moving bodies to central positions of the potential risks. Moreover, the Voronoi region definitions of can be changed on an ongoing basis.

However, in related autonomous distributed control that defines Voronoi regions, potential risks addressable by a single moving body is to be present in each region of responsibility, and in reality situations such as the following may be regularly envisaged.

Situation 1

No potential risk is present in a region of responsibility, such that a moving body does not fulfil a monitoring function (what are referred to as idle moving bodies are present).

Situation 2

In cases in which there is a potential risk present that could be monitored by a single moving body straddles two or more regions of responsibility, monitoring is performed by the moving bodies in the respective regions of responsibility, with two or more moving bodies monitoring the potential risk with excess capability.

Situation 3

A potential risk for which monitoring by a single moving body would be insufficient is present in a single region of responsibility.

Note that in the present specification, the ratio of monitoring regions that can be monitored by moving bodies to potential risks is referred to as the "coverage ratio". The coverage ratio may be expressed simply as a ratio (area of monitoring regions/area of potential risks), or may be expressed as a percentage ((area of monitoring regions/area of potential risks)×100%). Here, the monitoring regions are the capture regions of sensors.

Namely, in Situations 1 to 3 above, the coverage ratio is not 1 (100%), and the monitoring ability of the moving bodies is not sufficiently exploited.

SUMMARY

The present disclosure is of a blind spot coverage device including a sensor section, a definition section, a determination section, and an instructing section. The sensor section senses external environmental information. The definition section defines an external environmental region where sensing information is unobtainable as a blind spot region. The determination section determines whether or not the blind spot region is to be covered. The instructing section, in cases in which the determination section has determined that the blind spot region is to be covered, instructs movement of an actuator so as to move such that the blind spot region can be covered. Moreover, the determination section is configured so as to determine that the blind spot region is to be covered in cases in which determination has been made that the blind spot region lacks global coverage.

BRIEF DESCRIPTION OF THE DRAWINGS

FIGS. 1A and 1B illustrate a moving body distributed control system according to an exemplary embodiment.

FIGS. 2A and 2B are plan views of a region that has been Voronoi partitioned according to the present exemplary embodiment.

FIGS. 3A to 3E are plan views illustrating correlations between moving bodies and potential risks according to the present exemplary embodiment.

DESCRIPTION OF EMBODIMENTS

Figure 1A:
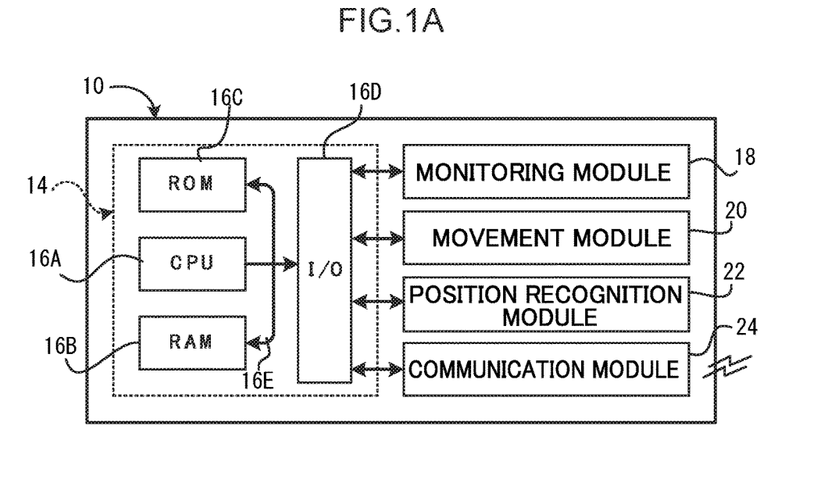
FIG. 1A is a block diagram of a control system used to operate moving bodies applied in the present exemplary embodiment.
Figure 1B:
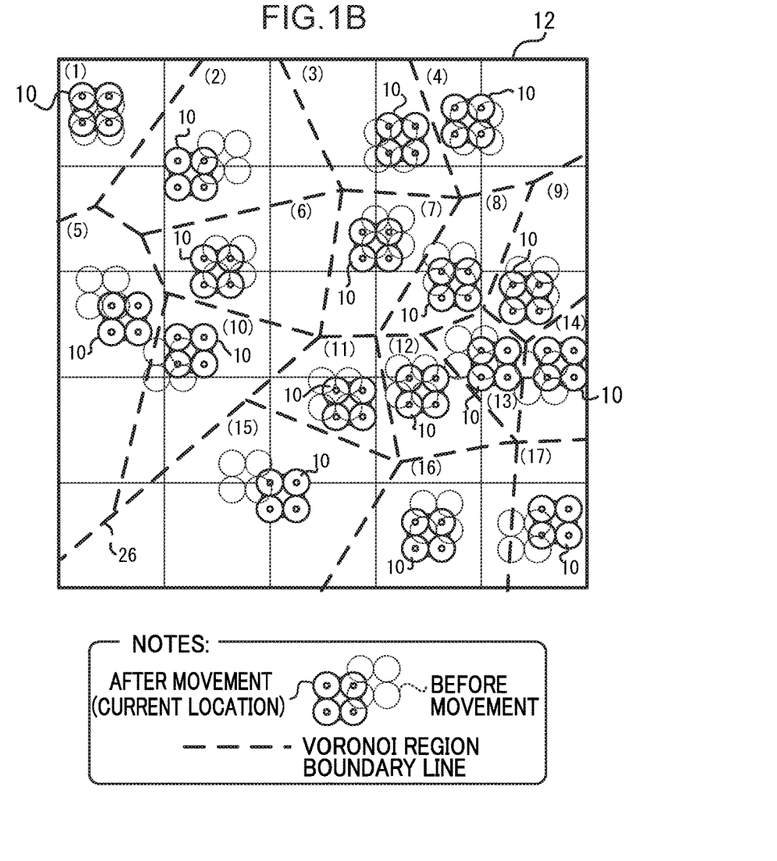
FIG. 1B is a plan view of a region in which the moving bodies move.

FIGS. 1A and 1B illustrate moving bodies 10 applied with a moving body distributed control system according to an exemplary embodiment, and a region 12 in which the moving bodies 10 moves. FIG. 1A is a block diagram of a control system for operating the moving body 10 (see FIG. 1B) applied in the present exemplary embodiment. Moreover, FIG. 1B is a plan view illustrating the region 12 in which the moving bodies 10 move. Plural of the moving bodies 10 are present in the region 12, and the moving bodies 10 are capable of moving independently of each other.

The moving bodies 10 are capable of unmanned movement within the range of the region 12 and, as illustrated in FIG. 1A, each is installed with a controller 14 provided with a microcomputer that executes control, including that of the aforementioned movement.

The microcomputer of the controller 14 includes a CPU 16A, RAM 16B, ROM 16C, an input/output port (I/O) 16D, and a bus 16E, such as a data bus, control bus, or the like connecting these sections together. A monitoring module 18, a movement module 20, a position recognition module 22, and a communication module 24 are connected to the I/O 16D.

The controller 14, for example, starts up a moving body distributed control program pre-stored in the ROM 16C in the CPU 16A, and controls operation of the monitoring module 18, the movement module 20, the position recognition module 22, and the communication module 24.

Monitoring Module 18

A camera, for example, is a typical device applied as the monitoring module 18 to image a specific monitoring range (field of view) from the position of the moving body 10.

Note that the monitoring module 18 is not limited to imaging with a camera, and may, for example, be configured to emit electromagnetic waves (radar, laser, ultrasound, or the like) to detect characteristic geographic objects (landmarks) or the like.

Movement Module 20

The moving body 10 of the present exemplary embodiment is a flying object (for example a drone), and includes plural propellers driven by independent drive sources (motors) as a device applied as the movement module 20. The moving body 10 is capable of flying in a direction toward a destination and stopping (hovering) at a destination position by controlling drive of the motors.

Note that the moving body 10 is not limited to being a flying object, and the movement module 20 may move over land or over water, and may employ plural devices together. As an even broader concept, a swing mechanism for a fixed installation monitoring camera may be included under the definition of the movement module 20.

Namely, the movement module may have any configuration capable of changing the monitoring range of the monitoring module 18.

Position Recognition Module 22

The position recognition module 22 has a function to recognize the position of the moving body 10 to which it is provided. The position recognition module 22 includes a sensor for at least one out of GPS, laser, radar, ultrasound, motion capture, a camera, wireless communication, or wireless signal intensity (distance information) as a device to obtain position information.

The position recognition module 22 recognizes the position of the moving body 10 to which it is provided using three-dimensional spatial coordinates or the like based on detection results (detection signals) with the sensor.

Note that as well as recognizing the position of the moving body 10 to which it is provided, the position recognition module 22 also acquires position information of other moving bodies 10 using the communication module 24, described later, and calculates distances therebetween in order to recognize the relative positional relationships of the plural moving bodies 10.

Communication Module 24

The communication module 24 includes a wireless communication device as a device. Wireless communication has a function to communicate between the moving bodies 10, and the communication module 24 includes a position information exchange section that exchanges position information, a coverage ratio exchange section that exchanges information (coverage ratio information) relating to the level of monitoring (coverage ratio, described in detail later) of designated monitoring target regions (sometimes referred to as "potential risks"), and a mediation information exchange section that exchanges mediation information relating to the allocation of monitoring target regions.

Mediation information is information used to determine whether or not the moving bodies 10 move toward a potential risk, and distinguishes potential risks by sign (positive or negative). For example, a potential risk defined as "positive" requires monitoring, and a potential risk defined as "negative" does not require monitoring.

Moreover, the communication module 24 includes a monitoring information transmission section for wireless communication to transmit results from monitoring with the monitoring module 18 (for example image information in the case of a camera) to a base station that performs overall management of monitoring.

The region 12 illustrated in FIG. 1B is Voronoi partitioned by the controller 14 of each moving body 10 based on position information from the position recognition module 22.

Voronoi partitioning analyzes the domains of influence of each point (in this case, the positions of the moving bodies 10), and collections of points having the shortest distance to respective moving bodies 10 expressed as single polygons are referred to as Voronoi regions. For example, in FIG. 1B, in Voronoi partitioning of a two-dimensional flat plane, boundary lines between the Voronoi partitions are perpendicular bisectors (dashed lines 26 in FIG. 1B) of line segments connecting between the moving bodies 10. One of the moving bodies 10 is always present in each Voronoi region (1) to (n) demarcated by the dashed lines 26. Note that the variable n is the number of Voronoi partitions, and n=17 in FIG. 1B.

In the present exemplary embodiment, in the range of the region 12, the moving bodies 10 move freely with respect to each other, and each time this occurs, the Voronoi regions change. The Voronoi regions in FIG. 1B are those when each of the moving bodies 10 has moved from the position indicated by dotted lines to the position indicated by solid lines.

Figure 2A:
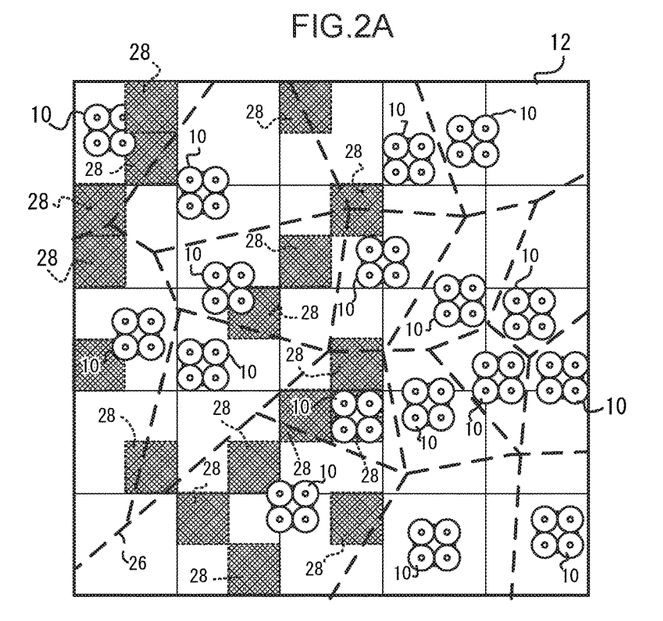
FIG. 2A illustrates the region when potential risks are designated.

Moreover, in the present exemplary embodiment, in the region 12 illustrated in FIG. 1B, monitoring target regions (potential risks) 28 are designated as illustrated in FIG. 2A.

In the present exemplary embodiment, the area of a single unit of potential risk 28 is made equivalent to the area of a monitoring range to the monitoring module 18 of one moving body 10 is capable of monitoring. Namely, when the center of one moving body 10 overlaps with the center of a potential risk 28 illustrated by a rectangular mesh pattern then all the potential risk 28 is in the monitoring range.

Note that the area of each of the potential risks 28 and the area of the monitoring range need not necessarily have a 1:1 relationship.

The positions of each moving body 10 in FIG. 2A are the same as the positions illustrated in FIG. 1B. Each moving body 10 moves toward a potential risk 28 in its own Voronoi region while the moving bodies 10 exchange position information with each other.

Figure 2B:
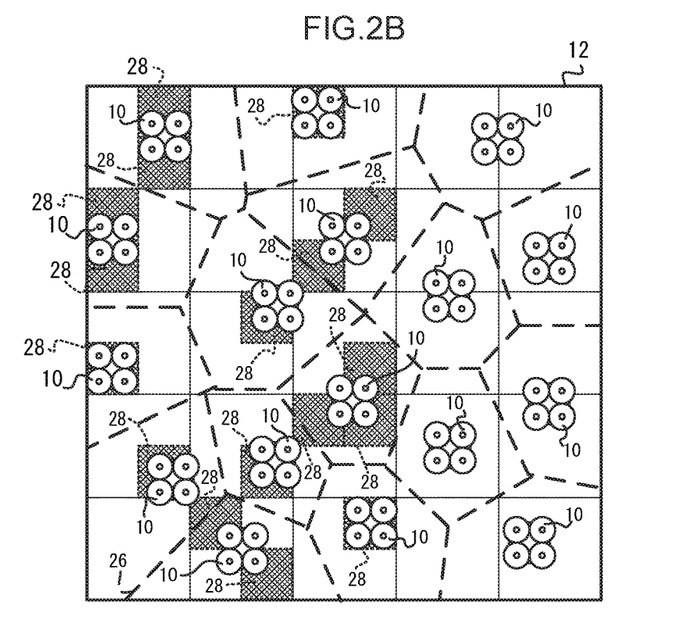
FIG. 2B illustrates the region after the moving bodies have moved based on a control rule 1.

FIG. 2B illustrates the result when the moving bodies 10 have moved from FIG. 2A under control of related technology that moves the moving bodies 10 toward the potential risks 28 while maintaining the Voronoi regions (control rule 1).

Here, under control rule 1, a situation arises in which it is not possible to make all of the potential risks 28 be monitoring ranges of the moving bodies 10.

Namely, the level of monitoring of the designated potential risks 28 can be expressed in terms of a coverage ratio. The coverage ratio is the area of monitoring regions of the moving bodies 10 divided by the area of the potential risks 28. Note that this may be expressed as a percentage ((area of monitoring regions of the moving bodies 10/area of the potential risks 28)×100%).

Based on control rule 1, it is apparent that in FIG. 2B there are potential risks 28 present for which the coverage ratio is less than 1 (less than 100%). On the other hand, the moving bodies 10 fulfil no function whatsoever when in a Voronoi region in which there is no potential risk 28 present.

Namely, even if the area of the monitoring regions of all of the moving bodies 10 is greater than the total area of the designated potential risks 28, control constrained by the control rule 1 is not able to monitor all of the potential risks 28.

Accordingly, in the present exemplary embodiment, in addition to control rule 1, control (control rule 2) is also established to move a moving body 10 so as to leave its own Voronoi region and move toward a potential risk 28 with an insufficient coverage ratio (0<coverage ratio <1) based on positional relationships between (the monitoring ranges of) the moving bodies 10 and the potential risks 28.

FIGS. 3A to 3E illustrate conceivable situations of positional relationships between (the monitoring ranges of) moving bodies 10 and potential risks 28.

Figure 3A:
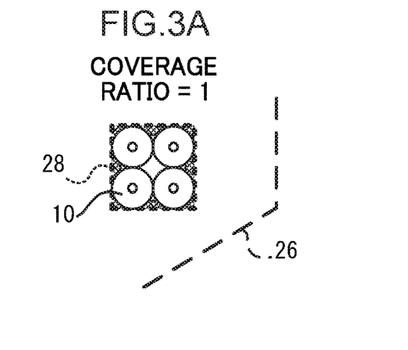
FIG. 3A illustrates a case in which a coverage ratio=1.

FIG. 3A illustrates a situation in which within a single Voronoi region there is a single moving body 10 addressing one block of potential risk 28. The area of the monitoring range of the single moving body 10 matches the area of the potential risk 28, such that the coverage ratio is 1, with this being an ideal relationship.

Figure 3B:
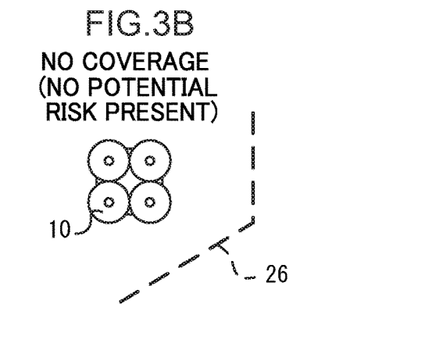
FIG. 3B illustrates a case in which there is no coverage.

FIG. 3B illustrates a case in which no potential risk 28 is present in the Voronoi region under the responsibility of a moving body 10, with this being the most inefficient relationship (Situation 1).

Figure 3C:
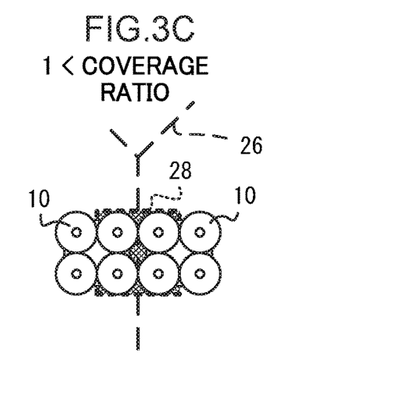
FIG. 3C illustrates a case in which 1<a coverage ratio.

FIG. 3C illustrates a case in which a designated single block of potential risk 28 straddling two Voronoi regions is addressed by the two moving bodies 10 responsible for the respective Voronoi regions. The area of the monitoring ranges of the two moving bodies 10 is greater than the area of the potential risk 28, such that the coverage ratio is greater than 1 (i.e. 2 (=200%)), thus giving a relationship in which there is an excess in the monitoring ranges of the moving bodies 10 (Situation 2).

Figure 3D:
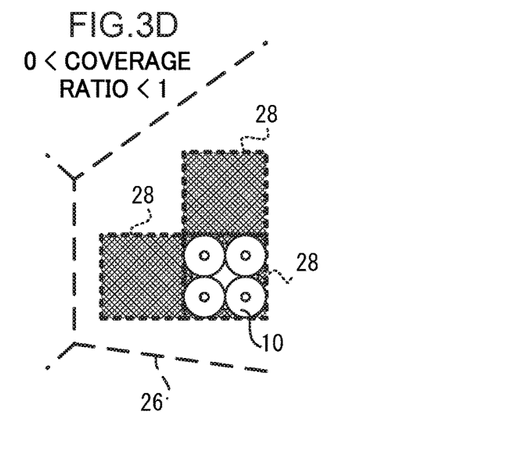
FIG. 3D illustrates a case in which 0<a coverage ratio <1.

On the other hand, FIG. 3D illustrates a situation in which three blocks of potential risk 28 within a single Voronoi region are addressed by a single moving body 10. The coverage ratio is less than 1 (0.333 . . . ), this being a relationship in which the potential risks 28 are insufficiently monitored.

In the relationship in FIG. 3A, the moving body 10 is preferably maintained in its current state.

The relationship in FIG. 3B (Situation 1) is a situation in which the monitoring range of one moving body 10 is going to waste. In other words, this is a situation in which the moving body 10 illustrated in FIG. 3B could be allocated to another potential risk 28.

The relationship in FIG. 3C (Situation 2) is a situation in which half of the monitoring range of each of the two moving bodies 10 is going to waste. In other words, without the constraint of the Voronoi regions, this is a situation in which one of the moving bodies 10 out of the two moving bodies 10 in FIG. 3C could be allocated to another potential risk 28.

On the other hand, the relationship in FIG. 3D is a situation in which two blocks of potential risk 28 cannot be monitored.

Figure 3E:
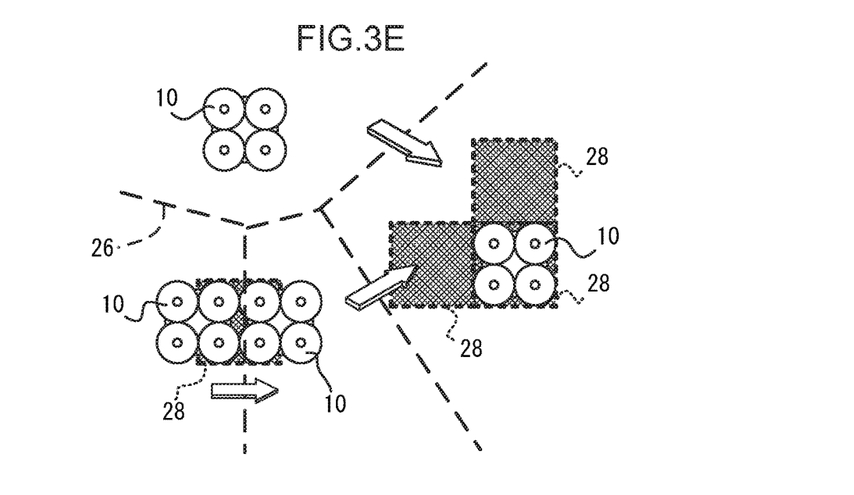
FIG. 3E illustrates a case in which moving bodies in a region are able to move so as to leave Voronoi regions.

The present exemplary embodiment recognizes the situations in FIG. 3B and FIG. 3C (Situation 1 and Situation 2 in which there is excess of monitoring range of the moving bodies), and the situation in FIG. 3D (a situation in which the monitoring range of the moving bodies 10 is insufficient), and so deviates from Voronoi region maintenance control (control rule 1) to set the control rule 2 permitting the moving bodies 10 to be moved so as to leave their current Voronoi regions (see FIG. 3E).

Moreover, in the present exemplary embodiment, in cases in which there is a difference between the importance level of the potential risks 28, movement of the moving bodies 10 is controlled according to the importance level.

Figure 4A:
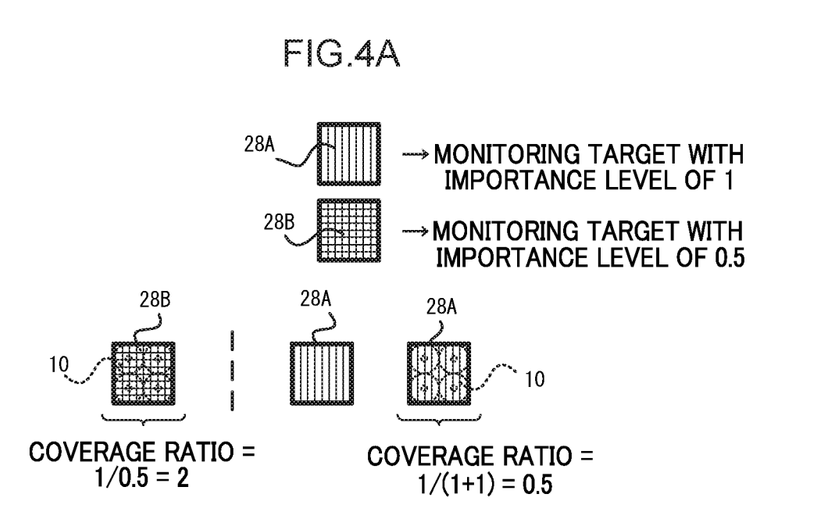
FIGS. 4A and 4B are coverage transition diagrams to illustrate changes to a coverage ratio according to priority levels in a case in which importance levels are set for potential risks.
Figure 4B:
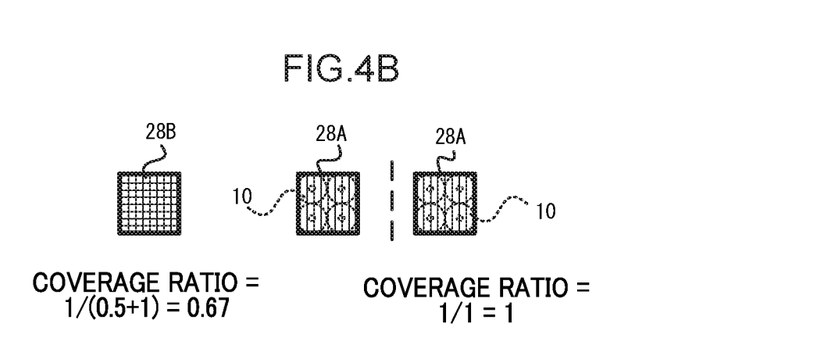

FIGS. 4A and 4B illustrate movement control of the moving bodies 10 based on the importance level.

Importance levels are, for example, expressed by numerical values greater than 0 and up to and including 1, with 1 being the highest importance level. FIGS. 4A and 4B envisage the presence of potential risks 28A with an importance level of 1 and potential risks 28B with an importance level of 0.5.

For example, as illustrated in FIG. 4A, there is a potential risk 28B with an importance level of 0.5 present in a first region. When this is covered (monitored) by a moving body 10 then, from the perspective of the importance level, since only 50% of the monitoring area capability of the moving body is being used, the coverage ratio is 1/0.5=2. Moreover, there are two potential risks 28A with an importance level of 1 present in a second region. When one of the potential risks 28A is covered (monitored) by a moving body 10, from the perspective of the importance level, 100% of the monitoring area capability of the moving body 10 is being used, such that the coverage ratio is 1/(1+1)=0.5.

Here, an overall evaluation of the coverage ratio taking into account the importance level is expressed as an evaluation index. The higher the numerical value of the evaluation index, the better the coverage ratio.

In FIG. 4A, the evaluation index for the two regions would be 0.5+1=1.5.

In contrast thereto, in a case in which there is a potential risk 28B with an importance level of 0.5 and a potential risk 28A with an importance level of 1 present in the first region, as illustrated in FIG. 4B, if the potential risk 28A is covered (monitored) by the moving body 10 then the coverage ratio would be 1/(0.5+1)=0.67. Moreover, there a potential risk 28A with an importance level of 1 present in the second region, and if covered (monitored) by the moving body 10 then the coverage ratio would be 1/1=1.

In FIG. 4B, the evaluation index for the two regions would be 1+1=2.

Namely, the overall coverage ratio can be improved by prioritizing coverage of the potential risks 28 of high importance level.

In the moving body 10 movement control performed under control rule 2 the following conditions are set, and the moving body 10 which is to be moved is selected by mediation between the moving bodies 10.

Condition 1

There must be no other moving body 10 present on a movement path of a moving body 10 moving to a potential risk 28 having an insufficient monitoring range (defined as "positive").

Condition 2

Any moving body 10 meeting Condition 1 must declare movement to other moving bodies 10.

Declaring movement is made by overwriting "negative" onto a potential risk 28 defined as being "positive". Moreover, the movement path is also overwritten as "negative". Accordingly, movement is only permitted for the moving body 10 that declared movement first, enabling a situation in which plural of the moving bodies 10 head toward a single potential risk 28, resulting in collisions or the like, to be avoided.

Figure 5:
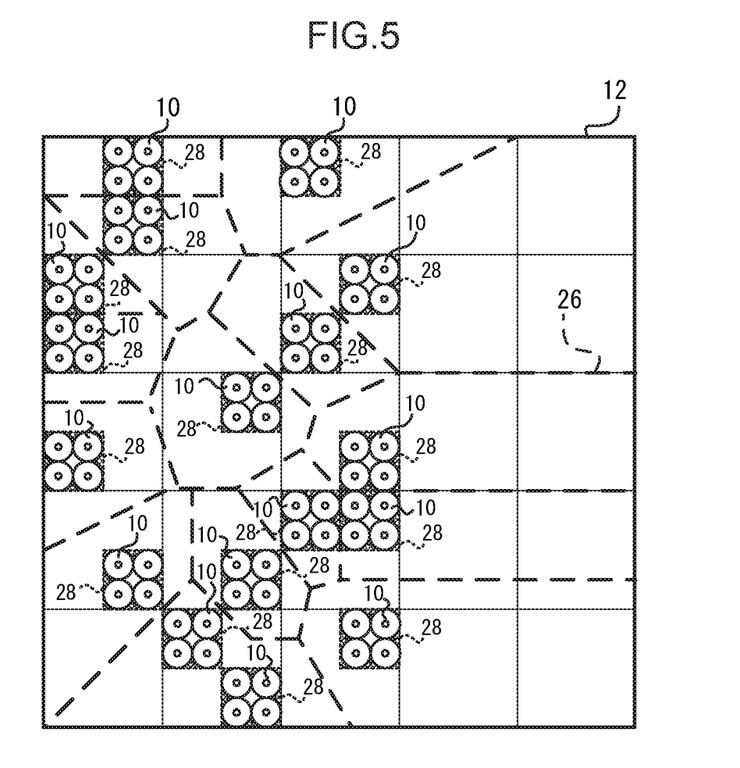
FIG. 5 is a plan view of a Voronoi partitioned region according to the present exemplary embodiment, and illustrates the moving bodies after being moved based on control rule 2 from the state illustrated in FIG. 2B.

FIG. 5 illustrates the result after the moving bodies 10 have moved from the state in FIG. 2B under control of control rule 2. It is apparent that a 1:1 relationship results for the monitoring ranges of the moving bodies 10 to all of the potential risks 28.

Figure 6:
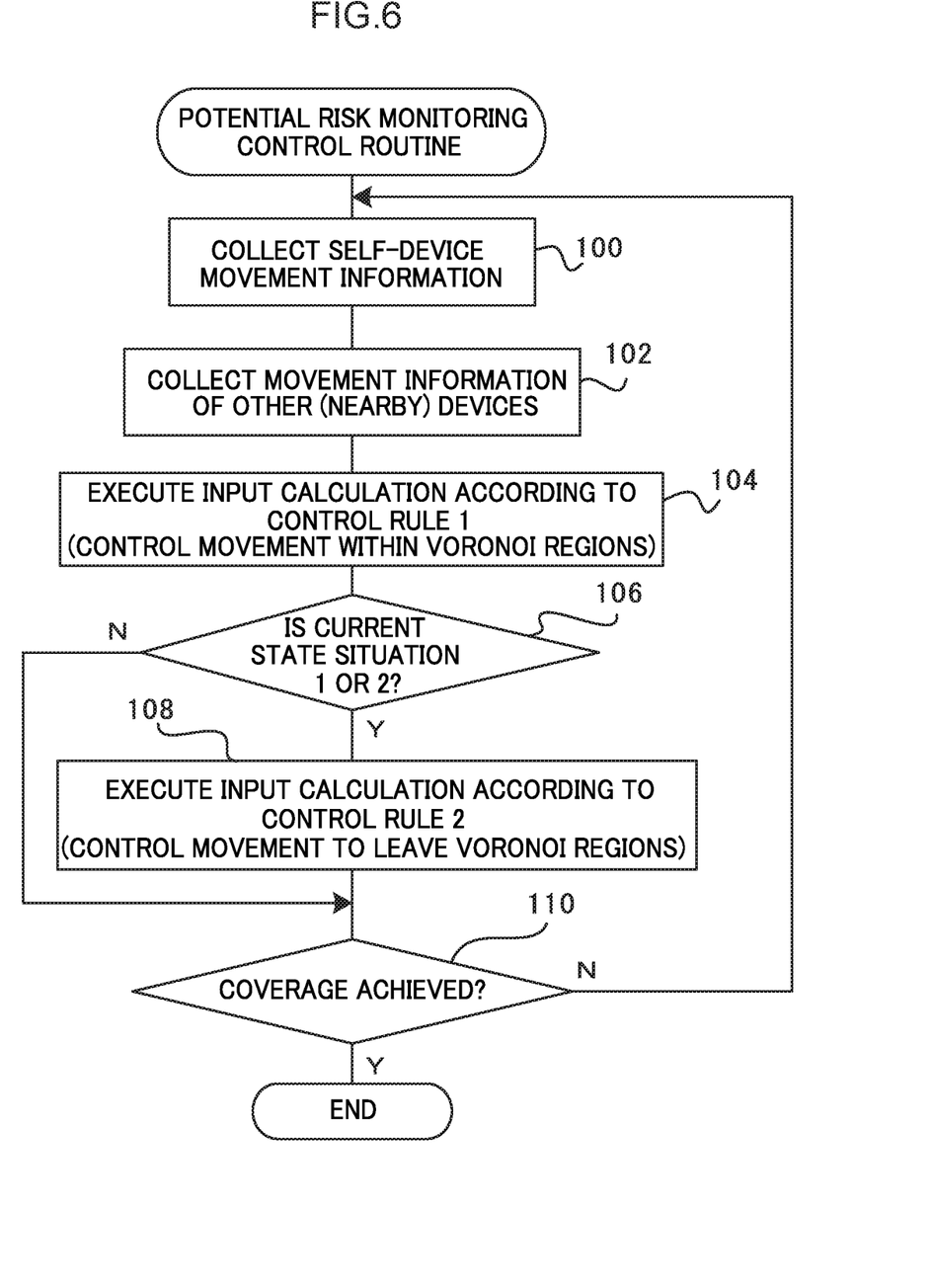
FIG. 6 is a flowchart illustrating a potential risk monitoring control routine according to the present exemplary embodiment.

Explanation follows regarding operation of the present exemplary embodiment, with reference to the flowchart of FIG. 6.

FIG. 6 is a flowchart illustrating a potential risk monitoring control routine according to the present exemplary embodiment, and mainly illustrates a dedicated flow of movement control of the moving bodies 10.

At step 100, a moving body 10 collects information relating to itself. Namely, the moving body 10 recognizes its own position information in the region 12 (see FIG. 1B), and transmits this position information to the other moving bodies 10.

At the next step 102, the moving body 10 collects information relating to the other moving bodies 10 (moving bodies 10 present in the region 12 other than itself). Namely, the moving body 10 recognizes the position information of the other devices, and transition to step 104.

At step 104, input calculation is executed under control rule 1. Namely, Voronoi regions are successively set for each of the moving bodies 10, and in cases in which there is a potential risk 28 present in a Voronoi region, movement control is executed so as to cover the potential risk 28.

At the next step 106, the moving body 10 ascertains its own current state. Namely, the moving body 10 determines whether it is in a situation in which there is no potential risk 28 present in its own moving body Voronoi region (Situation 1), or it is in a situation in which there is a potential risk 28 in its own moving body Voronoi region that is smaller than the monitoring area of the moving body (the coverage ratio is greater than 1) (Situation 2), or it is in another situation.

In cases in which determination is affirmative at step 106, namely in cases in which either Situation 1 or Situation 2 are determined to exist, processing transitions to step 108, and input calculation is executed following control rule 2. Namely, mediation is performed regarding which moving body 10 to move outside its own Voronoi region and toward a potential risk 28 having a coverage ratio of less than 1 (coverage ratio <1), then control is executed to move the moving body 10 determined by the mediation so as to leave its own Voronoi region and move toward the potential risk 28, and processing transitions to step 110.

In cases in which determination is negative at step 106, processing transitions to step 110.

At step 110, determination is made as to whether or not coverage of all of the potential risks 28 has been achieved. In cases in which determination is affirmative, the current routine is ended. In cases in which determination is negative at step 110, processing returns to step 100, and the above process is repeated.

Note that in cases in which the total area of the potential risks 28 is greater than the total area capable of being monitored by the plural moving bodies 10, the moving bodies 10 may tasked to address plural potential risks 28 over a time series so as to obtain information about all the potential risks 28.

With the aim of avoiding collisions as plural moving bodies 10 move freely in the region 12, the present exemplary embodiment enables the coverage ratio of the potential risks 28 to be improved by, as control rule 2, mediating movement to potential risks 28 with low coverage ratios (for example on a first-come-first-served basis) and moving the moving bodies 10 so as to leave their current Voronoi regions when there is a need to correct a reduction in coverage ratio of the potential risks 28 caused as a result of setting the Voronoi regions based on control rule 1.

Example 1

Figure 7A:
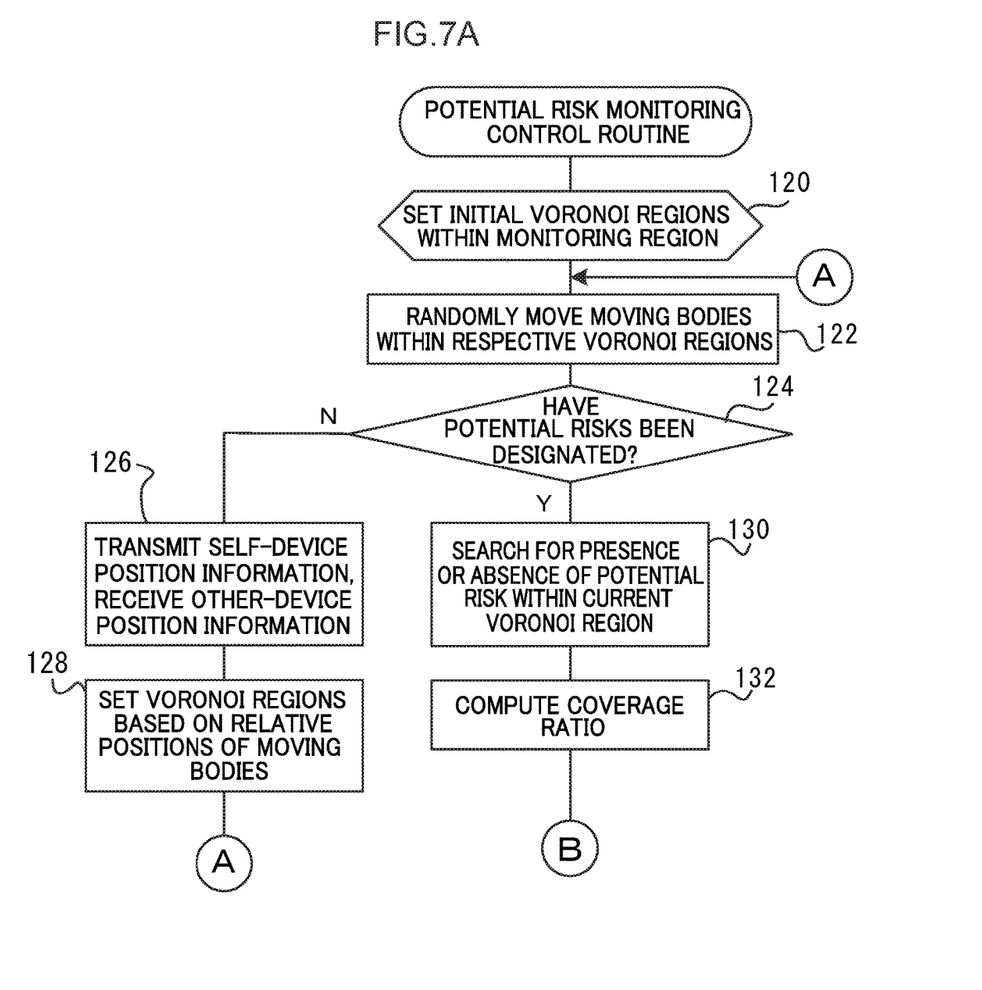
FIGS. 7A and 7B illustrate an Example 1 of the present exemplary embodiment, and are flowcharts of a potential risk monitoring control routine in an example configured so as to determine which moving body 10 to move to a destination potential risk 28 based on the principle of first-come first-served.
Figure 7B:
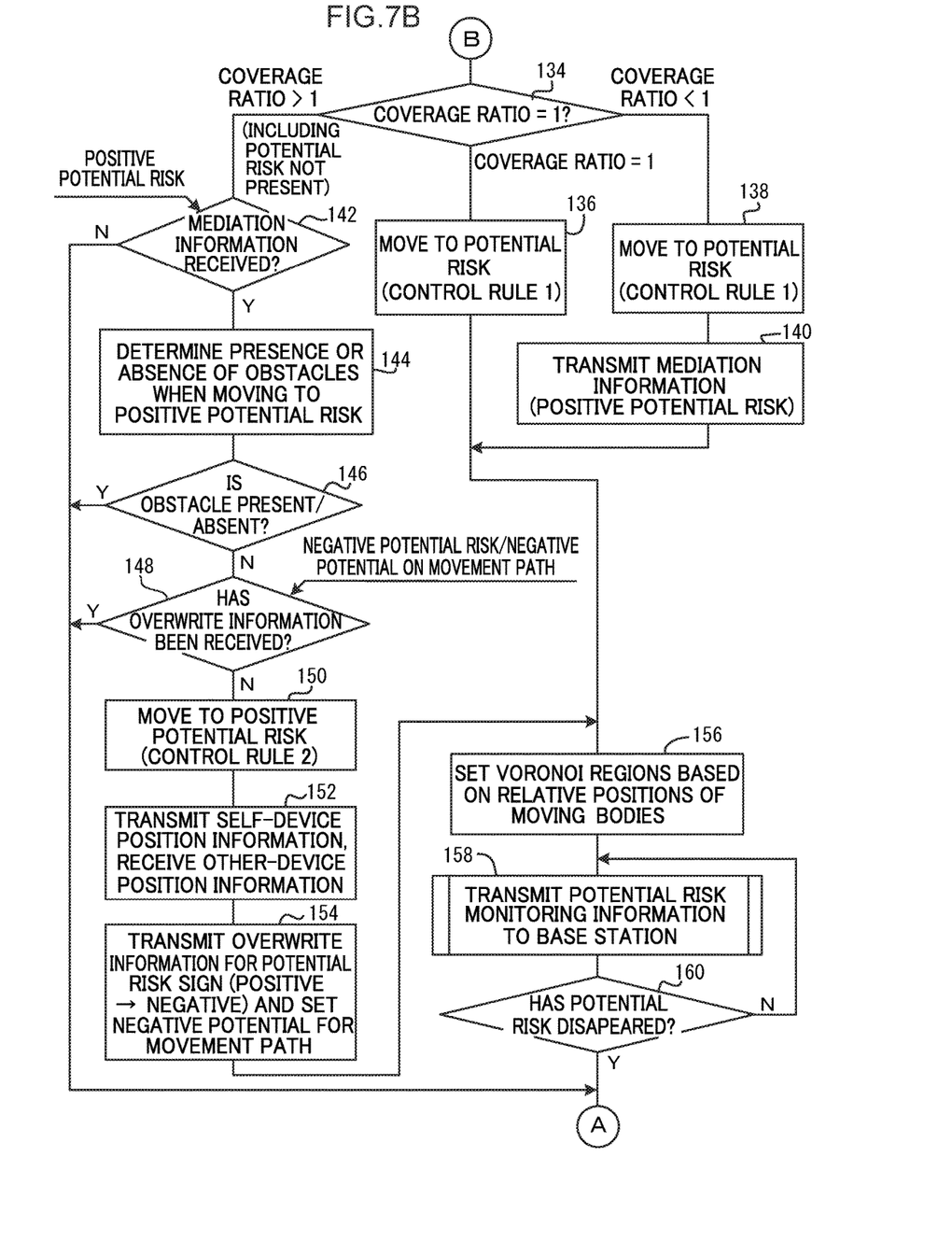

In the present exemplary embodiment, when potential risk monitoring control is executed based on the flowchart of FIG. 6, there is a need for mediation in order to avoid interference (collisions) between the moving bodies 10 moving toward potential risks 28, in particular in the case of control rule 2. FIGS. 7A and 7B are flowcharts illustrating a potential risk monitoring control routine as an Example in which the moving body 10 to be moved toward a destination potential risk 28 is decided based on the principle of first-come-first-served.

As illustrated in FIG. 7A, at step 120, initial Voronoi regions are set in the region 12 as illustrated in FIG. 1B. Next, processing transitions to step 122 and the moving bodies 10 are moved randomly within their respective Voronoi regions. Processing then transitions to step 124.

At step 124, determination is made as to whether or not potential risks 28 have been designated. In cases in which determination is negative, processing transitions to step 126, and each moving body 10 transmits its own position information and receives position information of other moving bodies 10. Next, processing transitions to step 128 and Voronoi regions are set based on the relative positions of the moving bodies 10. Processing then returns to step 122.

Moreover, in cases in which determination is affirmative at step 124, processing transitions to step 130, and the presence or absence of a potential risk 28 in the current Voronoi region is searched for. Next, processing transitions to step 132, the coverage ratio is calculated, and processing transitions to step 134 (FIG. 7B).

At step 134, processing branches depending on the calculated coverage ratio.

Namely, in cases in which determination has been made at step 134 that the coverage ratio=1, there is a 1:1 relationship between the area of the potential risk 28 and the area of the monitoring range of the moving body 10. Determination is thus made that monitoring of the potential risk 28 is possible under control by control rule 1, and processing transitions to step 136, and the moving body 10 is moved to the potential risk 28 based on control rule 1. Processing then transitions to step 156. In such cases, the moving body 10 is capable of covering all of the potential risk 28 inside its own Voronoi region (region of responsibility) (see the state in FIG. 3A).

Moreover, in cases in which determination has been made at step 134 that the coverage ratio <1, processing transitions to step 138, and the moving body 10 is moved to a potential risk 28 inside its own Voronoi region based on control rule 1. Processing then transitions to step 140, and mediation information (a positive potential risk indicating that all of the potential risks 28 cannot be covered) is transmitted, before transitioning to step 156. In such cases, the moving body 10 is capable of covering at least part of the potential risks 28 in its own Voronoi region (region of responsibility) (see the state in FIG. 3D).

On the other hand, in cases in which determination is made at step 134 that the coverage ratio >1 (including cases in which there is no potential risk 28 present), determination is made that a potential risk 28 present in a Voronoi region of another device could be covered (see the states in FIG. 3B and FIG. 3C). Processing transitions to step 142, and determination is made as to whether or not mediation information (a positive potential risk) has been received.

In cases in which determination is negative at step 142, processing returns to step 122. In cases in which determination is affirmative at step 142, processing transitions to step 144, and determination is made as to whether or not there is an obstacle present when moving toward the positive potential risk. Processing transitions to the next step 146, and determines whether or not an obstacle is present. In cases in which the determination at step 146 is "obstacle present", processing returns to step 122. In cases in which the determination at step 146 is "obstacle absent", processing transitions to step 148, determination is made as to whether or not overwrite information (a negative potential risk and a negative potential for a movement path, indicating that the potential risk 28 is being covered) has been received. In cases in which determination is negative at step 148, processing transitions to step 150. At this point in time, the exclusive right to move to the potential risk 28 is attained (on the principle of first-come-first-served). In cases in which determination is affirmative at step 148, determination is made that there is no exclusive right, and processing returns to step 122.

At step 150, the moving body 10 is moved toward a potential risk based on control rule 2, and processing transitions to the next step 152 where the moving body 10 transmits its own position information and receives other device position information. Then, processing transitions to step 154, and, in order to declare that it has attained the exclusive right, the moving body 10 transmits overwrite information to overwrite the mediation information (positive potential risk→negative potential risk) and transmits negative potential information for the travel path, before processing transitions to step 156.

At step 156, Voronoi regions are set based on the relative positions of the moving bodies 10. Processing then transitions to step 158, and potential risk 28 monitoring information (for example imaging information) is transmitted to the base station. Processing then transitions to step 160. At step 160, determination is made as to whether or not the potential risk 28 has disappeared. In cases in which determination is negative, processing returns to step 158. In cases in which determination is affirmative at step 160, processing returns to step 122.

Example 2

Figure 8:
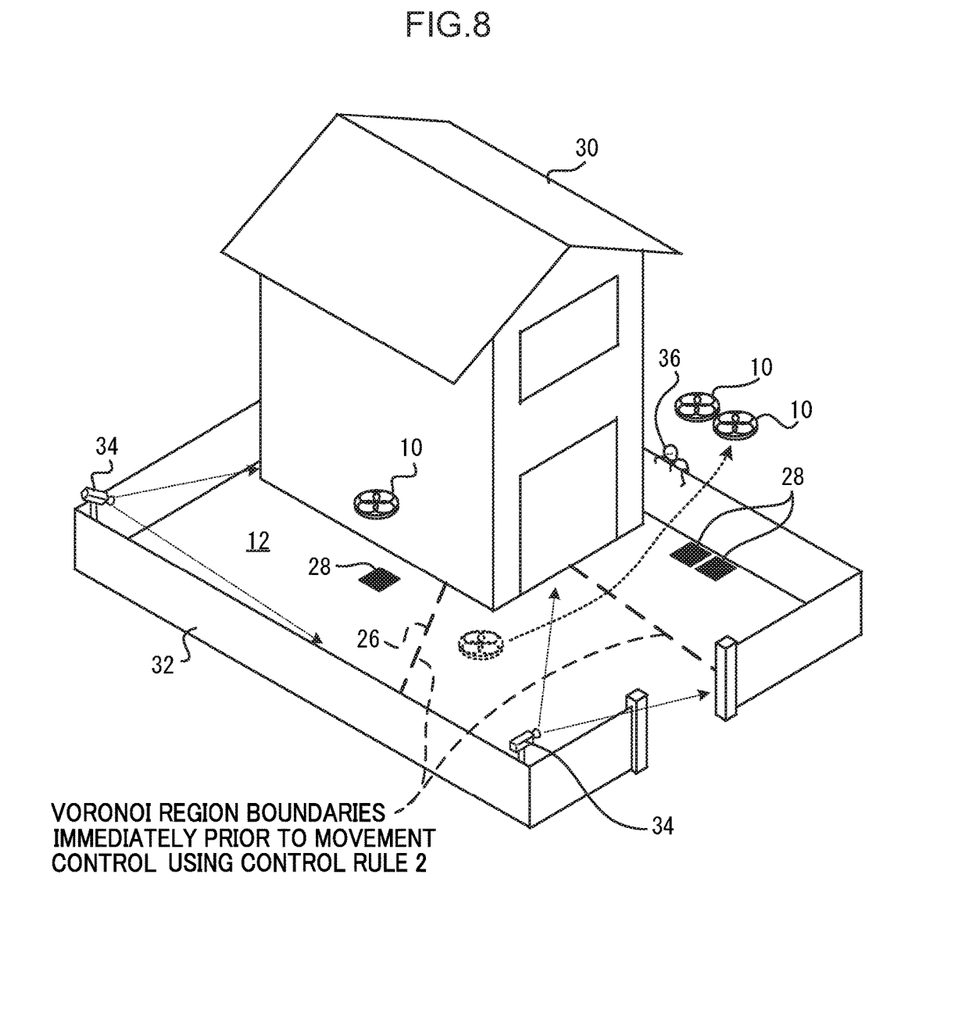
FIG. 8 illustrates an Example 2 of the present exemplary embodiment, and is an example of a case in which a moving body distributed control system is employed for monitoring in a home security system.

FIG. 8 illustrates an Example 2 of an exemplary embodiment of the present disclosure, this being an example in which the moving body 10 distributed control system is employed in the monitoring of a home security system.

As illustrated in FIG. 8, a wall 32 is provided around the periphery of a house 30, and a property enclosed by the wall 32 is monitored by fixed monitoring cameras 34. Three of the moving bodies 10 are deployed within the property, the property is Voronoi partitioned, and the moving bodies 10 move while avoiding collisions with each other.

For example, in cases in which the presence of a suspicious person 36 has been detected by the fixed monitoring cameras 34, potential risks 28 are set in order to focus monitoring on the region where the suspicious person 36 was detected. When this is performed, although the potential risks 28 are not able to be sufficiently covered by a single moving body 10 in cases in which there are Voronoi regions present, the three moving bodies 10 can be moved to the potential risks 28 based on control rule 2.

Note that in cases in which there is a blind spot present on the property, monitoring may be focused on the blind spot. Moreover, although in the monitoring example of Example 2 it is a property around the house 30 that is monitored, a property employed as a parking lot may be monitored. In the case of a parking lot, blind spots for fixed monitoring cameras change depending on the number and positions of parked vehicles, and therefore monitoring using the moving bodies 10 is effective.

Example 3

Figure 9A:
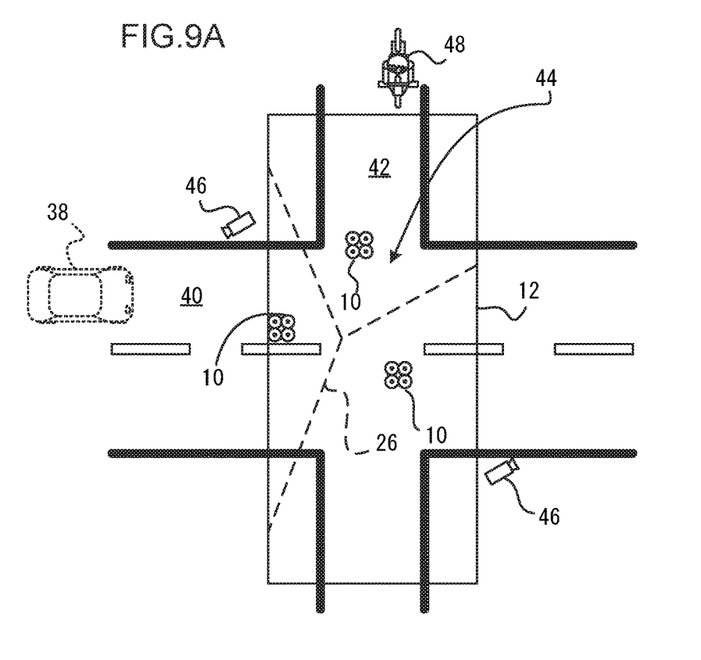
FIGS. 9A and 9B illustrate an Example 3 of the present exemplary embodiment, and are examples of a case in which a moving body distributed control system is employed to monitor a cross road in order to prevent accidents.
Figure 9B:
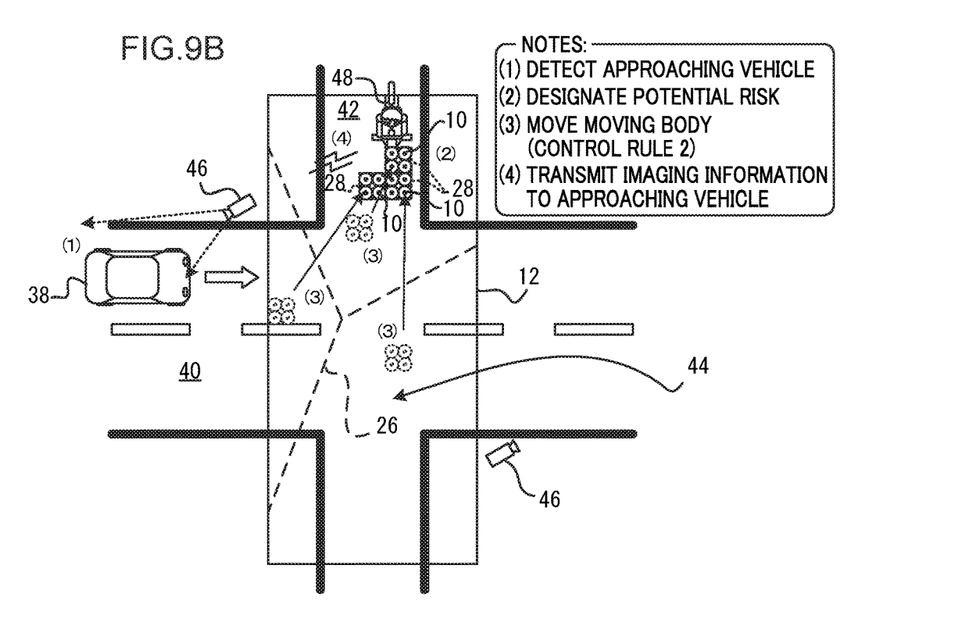

FIGS. 9A and 9B illustrate an Example 3 of an exemplary embodiment of the present disclosure, this being an example in which the moving body 10 distributed control system is employed for monitoring at a crossroads in order to prevent accidents.

As illustrated in FIG. 9A, at a crossroad 44 where a side-road 42 intersects a main road 40 on which vehicles 38 can travel, a monitoring camera 46 is installed on the main road 40 to monitor the approach of the vehicles 38. Three moving bodies 10 are deployed in a preset region 12 at the crossroad 44. The site is Voronoi partitioned and the moving bodies 10 move while avoiding collisions with each other.

For example, as illustrated in FIG. 9B, in cases in which the approach of a vehicle 38 has been detected by the monitoring camera 46, a prediction is made that a bicycle 48 or the like might suddenly emerge from the side-road 42 onto the main road 40 at the side the vehicle 38 is travelling on (from the side-road 42 on the upper side in FIG. 9B), and potential risks 28 are set in order to focus monitoring on a region including the side-road 42. When this is performed, although the potential risks 28 are not able to be sufficiently covered by a single moving body 10 in cases in which there are Voronoi regions present, the three moving bodies 10 can be moved to the potential risk 28 based on control rule 2.

Image information imaged by the moving bodies 10 is transmitted to the vehicle 38 to enable the driver to recognize the danger in advance.

Although examples have been given of monitoring of the property of the house 30 as illustrated in FIG. 8, and of monitoring to recognize danger at the crossroad 44 in advance as illustrated in FIGS. 9A and 9B, other examples include applications executed by plural moving bodies 10 that normally monitor a wide monitoring range, such as a mountain or an office building, to identify people in need of rescue in disaster situations by designating potential risks in regions smaller than the usual range in order to carry out focused search and rescue operations.

The present disclosure is of a blind spot coverage device including a sensor section, a definition section, a determination section, and an instructing section. The sensor section senses external environmental information. The definition section defines an external environmental region where sensing information is unobtainable as a blind spot region. The determination section determines whether or not the blind spot region is to be covered. The instructing section, in cases in which the determination section has determined that the blind spot region is to be covered, instructs movement of an actuator so as to move such that the blind spot region can be covered. Moreover, the determination section is configured so as to determine that the blind spot region is to be covered in cases in which determination has been made that the blind spot region lacks global coverage.

In the blind spot coverage device of the present disclosure, the external environmental region where sensing information is unobtainable is defined as the blind spot region, and determination is made that the blind spot region is to be covered in cases in which the blind spot region has been determined to not be globally coverable. This enables movement of the actuator to be instructed to move such that the blind spot region can be covered.

In the present disclosure, the actuator is configured so as to move a moving body provided with the sensor section, and the determination section makes a determination according to a coverage ratio defined as a proportional coverage of the blind spot region, and determines that the blind spot region is to be covered in cases in which the coverage ratio is less than 1.

Determination that the blind spot region is not globally covered over a broad region may be determination by the numerical value of the coverage ratio defined as the proportional coverage of the blind spot region. Namely, determination may be made that the blind spot region is to be covered in cases in which the coverage ratio is less than 1. Moreover, the instruction section is capable of avoiding collisions between moving bodies by instructing movement of only a sufficient number of the moving bodies needed to cover the blind spot region that is to be covered.

The present disclosure relates to a control device that includes a sensor section to sense external environmental information and that controls to cover a blind spot region in an external environmental region where sensing information is unobtainable. The control device includes a definition section, a determination section, and an instructing section. The definition section defines an external environmental region where sensing information is unobtainable as a blind spot region. The determination section determines that the blind spot region is to be covered in cases in which a coverage ratio defined as a proportional coverage of the blind spot region is less than 1. The instructing section, in cases in which the determination section has determined that the blind spot region is to be covered, instructs movement of an actuator so as to move such that the blind spot region can be covered.

According to the control device of the present disclosure, an external environmental region where sensing information is unobtainable is defined as the blind spot region. Determination is made that the blind spot region is to be covered in cases in which the coverage ratio defined as the proportional coverage of the blind spot region is less than 1. This enables movement of the actuator to be instructed so as to move such that the blind spot region can be covered when determination has been made that the blind spot region is to be covered.

The present disclosure relates to a control device in a moving body distributed control system that includes plural moving bodies respectively disposed in mutually non-overlapping regions of responsibility and each installed with a sensor capable of changing a monitoring range, and that includes a fixed sensor as required. The distributed control system moves the plural moving bodies so as to change the regions of responsibility while avoiding collisions by the plural moving bodies exchanging position information between each other. The control device includes a movement control unit, a coverage ratio information communication unit, a determination unit, and a mediation unit. The movement control unit, when a designated monitoring target region is present in a region of responsibility of a moving body itself, moves the moving body such that the designated monitoring target region is in a monitoring range. The coverage ratio information communication unit transmits information relating to a coverage ratio representing a monitoring level of the monitoring target region in the region of responsibility of the moving body itself after being moved by the movement control unit, and receives information relating to a coverage ratio representing a monitoring level of the monitoring target region in a region of responsibility of another moving body. The determination unit determines whether or not a condition has been met to move a moving body beyond its own current region of responsibility to a monitoring target region within a region of responsibility of another device for which the coverage ratio received by the coverage ratio information communication unit is less than 100%. The mediation unit executes mediation in order to establish which moving body to move, from out of plural moving bodies containing any moving bodies for which the condition for moving themselves has been met in the determination unit.

The control device of the present disclosure includes the plural moving bodies that are respectively disposed in mutually non-overlapping regions of responsibility and that move within their respective regions of responsibility such that the monitoring ranges of sensors installed thereto can be changed. The plural moving bodies are moved to change their regions of responsibility while avoiding collisions by exchanging position information between each other. For example, Voronoi partitioning control may be applied as control when moving the moving bodies while avoiding collisions.

Note that when a designated monitoring target region is present in the region of responsibility of a moving body itself, the movement control unit moves the moving body such that the designated monitoring target region is in the monitoring range.

The coverage ratio information communication unit exchanges information relating to the coverage ratio representing the monitoring level of the monitoring target region after being moved by the movement control unit.

The determination unit determines whether or not the condition has been met to move a moving body beyond its own current region of responsibility to a region of responsibility of another moving body, to a monitoring target region for which the coverage ratio is less than 100%. The mediation unit executes mediation in order to establish which moving body to move, from out of the plural moving bodies in which the condition for moving has been met in the determination unit.

This thereby enables moving bodies to be moved to monitoring target regions outside their own regions of responsibility while avoiding collisions between the plural moving bodies, thus enabling an increase in the coverage ratio of the monitoring target region to be achieved.

In the present disclosure, the determination unit determines whether or not there would be a collision with another moving body on a movement path to a destination monitoring target region.

A condition is set that other moving bodies must not be present on a movement path to the destination monitoring target region. In cases in which there is another moving body present on the movement path to the destination monitoring target region, collision avoidance is prioritized, and movement is abandoned.

In the present disclosure, the mediation unit performs mediation based on at least one out of a duration until the condition is met, a time taken for movement, and a demanded sensor function.

For example, in mediation by the mediation unit according to the duration until the condition is met, when one moving body has met the condition in the shortest time from out of plural of the moving bodies, that moving body is selected by transmitting information to restrict the movement of other moving bodies. As an example, a designated monitoring target is set with a sign (positive or negative), with coverage being demanded in cases in which the sign is positive, and coverage not being demanded in cases in which the sign is negative. The first moving body to meet the condition transmits information to overwrite the positive sign with a negative sign, thereby restricting movement of moving bodies that meet the condition later. Setting negative signs on the movement path too enables other moving bodies to be kept away from the movement path.

Moreover, in mediation using the time taken for movement, the moving body capable of moving to the destination monitoring target earliest is selected.

Moreover, in mediation using the demanded sensor function, for example, for each of the moving bodies, in cases in which a moving body is present that obtains as information imaged visual information is present, or a moving body is present that obtains specialized signals using an ultrasound sensor or an infrared sensor, the moving body is selected based on the information demanded.

The present disclosure relates to a moving body distributed control program, the program causing a computer to operate as the control device according to the present disclosure.

The present disclosure can improve a coverage ratio under autonomous distributed control. The coverage ratio is a ratio of regions where moving bodies can monitor to potential risks.

What is claimed is:

1. A control device in a moving body distributed control system that includes a fixed sensor and a plurality of moving bodies that are respectively disposed in mutually non-overlapping regions of responsibility and that are each provided with a sensor capable of changing a monitoring range, the distributed control system moving the plurality of moving bodies so as to change the regions of responsibility while avoiding collisions due to the plurality of moving bodies exchanging position information between each other, the control device comprising:

a movement control unit that, in a case in which a designated monitoring target region is present in a region of responsibility of a self-moving body, moves the self-moving body such that the designated monitoring target region is in a monitoring range;

a coverage ratio information communication unit that transmits information relating to a coverage ratio representing a monitoring level of the monitoring target region in the region of responsibility of the self-moving body after being moved by the movement control unit, and that receives information relating to a coverage ratio representing a monitoring level of the monitoring target region in a region of responsibility of a moving body other than the self-moving body;

a determination unit that determines whether or not a condition has been met to move the self-moving body beyond its own current region of responsibility to a monitoring target region within a region of responsibility of another device for which the coverage ratio received by the coverage ratio information communication unit is less than 100%; and a mediation unit that executes mediation in order to establish which moving body to move, from a plurality of moving bodies including the self-moving body, for which the condition for moving themselves is met in the determination unit.

2. The control device of claim 1, wherein the determination unit determines whether or not there would be a collision with a moving body other than the self-moving body on a movement path to a destination monitoring target region.

3. The control device of claim 1, wherein the mediation unit performs mediation based on at least one of a duration until the condition is met, a time taken for movement, or a demanded sensor function.

* * * * *